ATTORNEYS

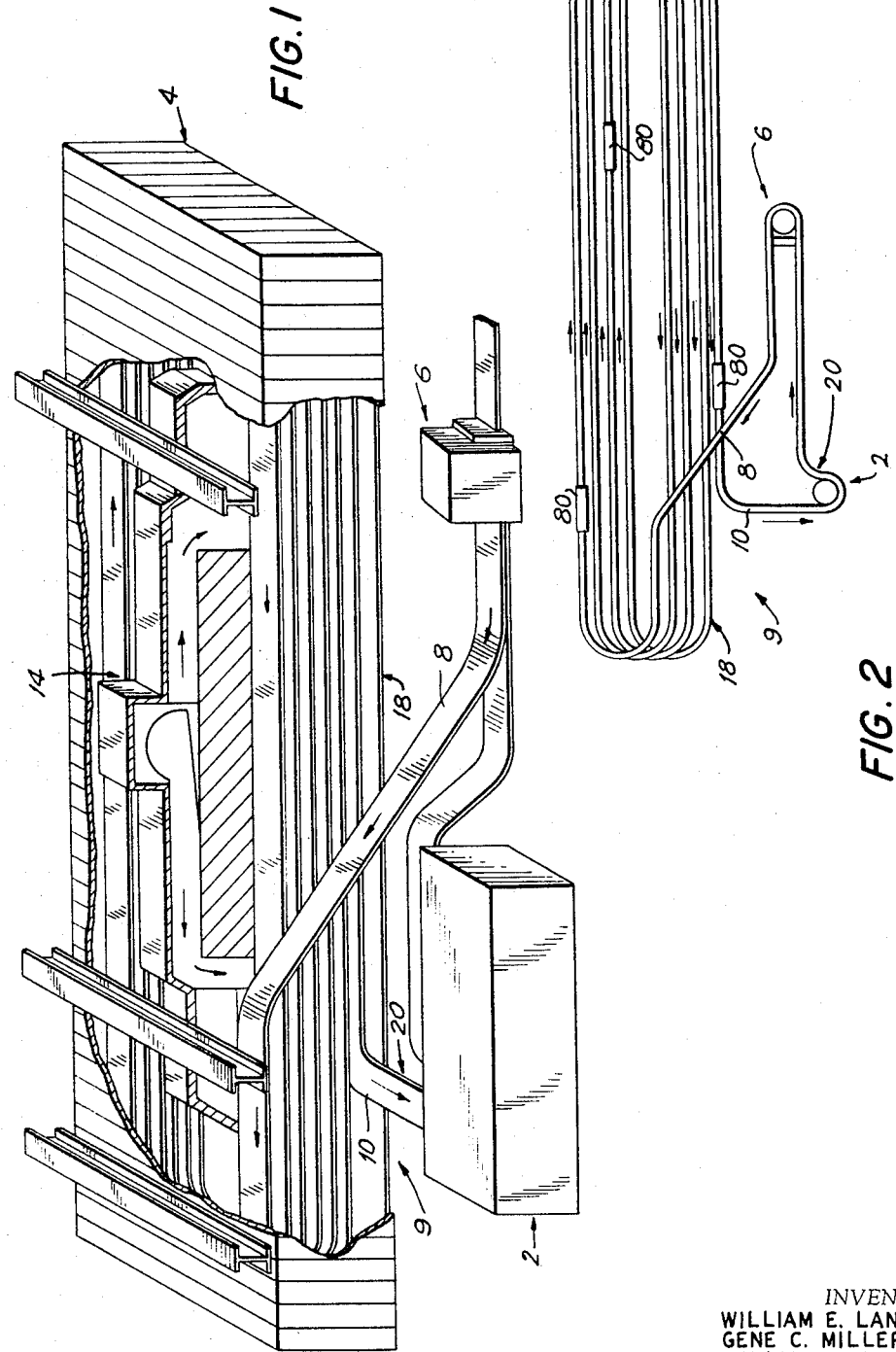

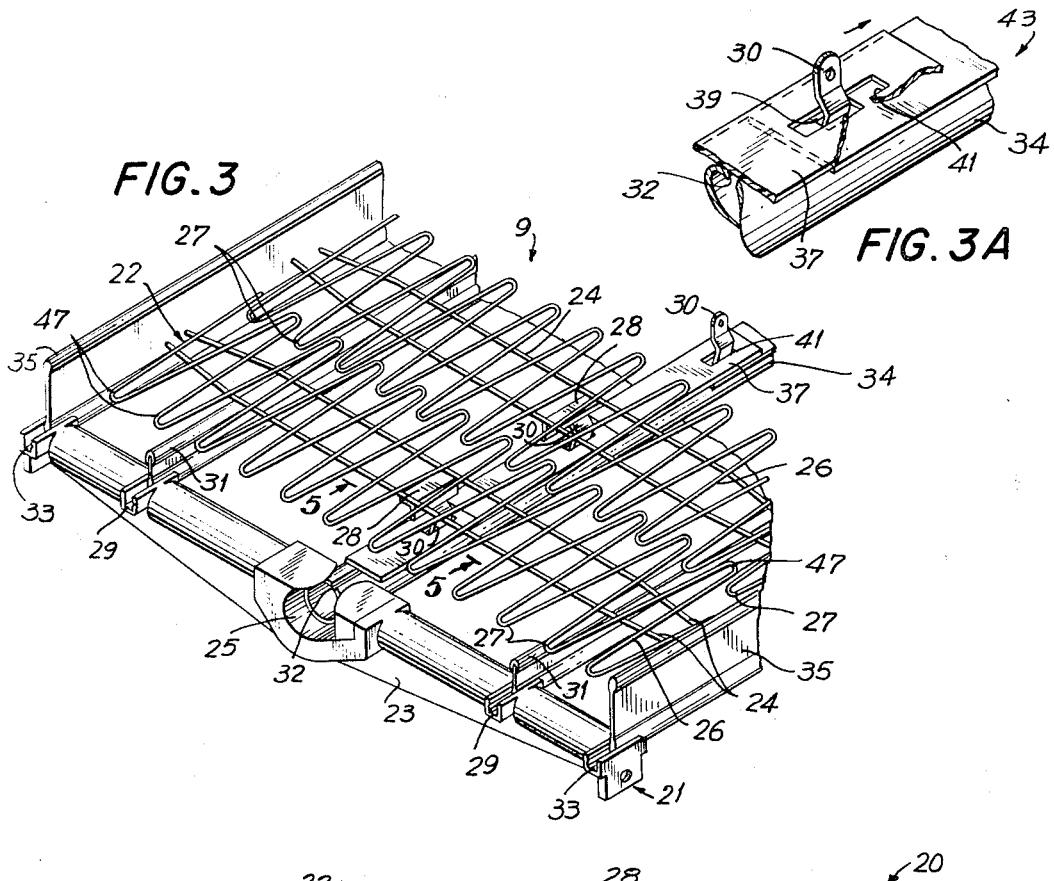
FIG. 3
FIG. 3A
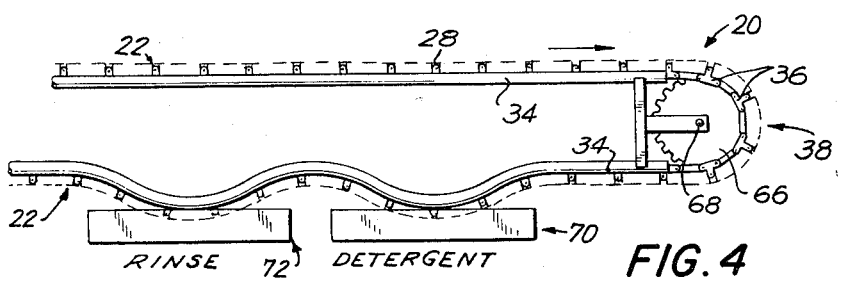
FIG. 4
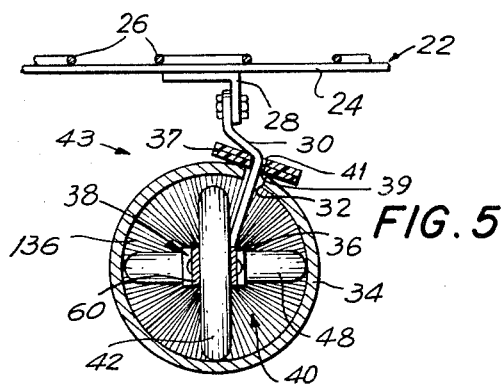
FIG. 5
INVENTORS
WILLIAM E. LANHAM
GENE C. MILLER
BY WILLIAM E. LANHAM, Jr.
ATTORNEYS INVENTORS
WILLIAM E. LANHAM
GENE C. MILLER
BY WILLIAM E. LANHAM, Jr.

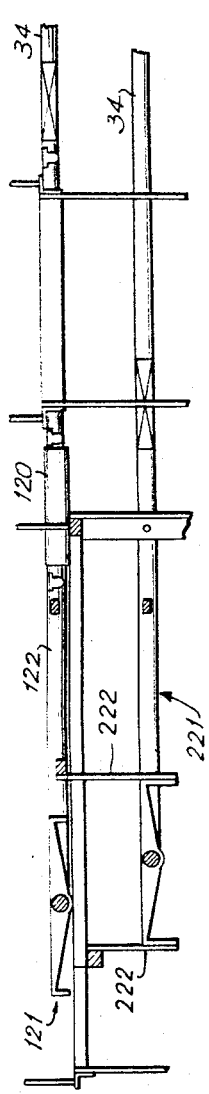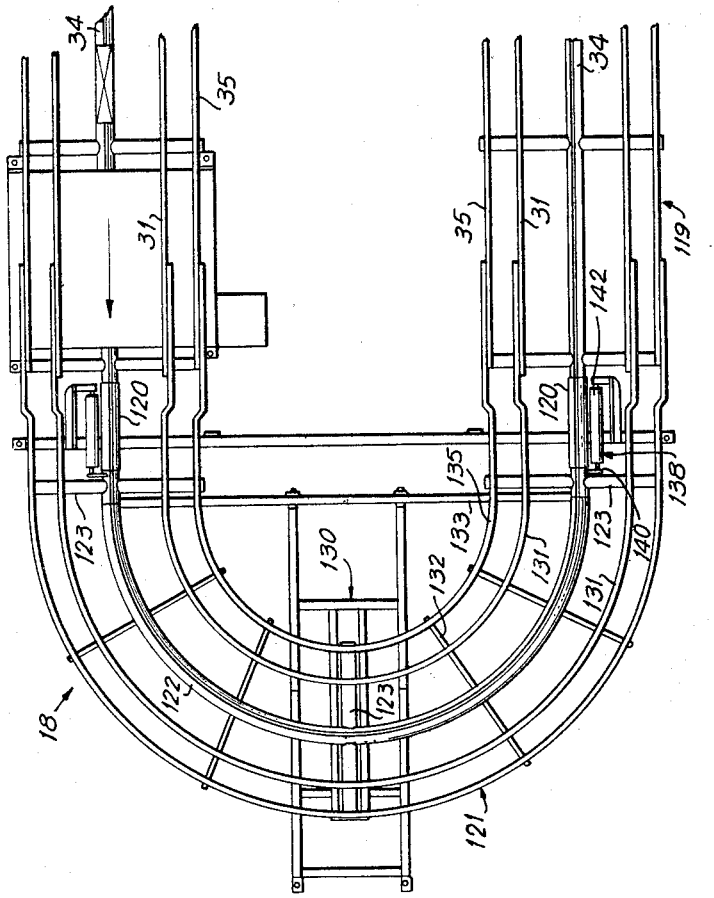

United States Patent Office 3,440,973
Patented Apr. 29, 1969

3,440,973
PROOFERS FOR BREAD PRODUCTS AND CONVEYOR SYSTEMS WHICH ARE ADAPTED TO USE THEREIN
William E. Lanham, 3456 Woods Drive; Gene C. Miller, 3540 Woods Drive; and William E. Lanham, Jr., 3044 Katherine Valley Road, all of Decatur, Ga. 30032
Continuation-in-part of application Ser. No. 448,732, Apr. 16, 1965. This application Nov. 10, 1966, Ser. No. 593,504
Int. Cl. A21c 9/00; A23g 7/00
U.S. Cl. 107—7            6 Claims

ABSTRACT OF THE DISCLOSURE

A proofing system for bakery products wherein an endless conveyor carries bakery products to be proofed through a proofing enclosure where the products are subjected to uniform proofing conditions.

---

This application is a continuation-in-part of our copending application Ser. No. 448,732, filed Apr. 16, 1965, now Patent No. 3,285,394.

The present invention relates to proofers and proofer systems for bakery products, particularly bread, rolls and similar bakery items. This invention also relates to improved conveyors and to special conveyor systems, for example, for handling bakery products prior to and subsequent to the baking operation.

An object of this invention is to provide improved proofer systems for raw dough items. A further object is to provide improved conveyors and conveyor systems. A further object is to provide conveyor systems of the type referred to above and which are efficient, dependable and adaptable to meet the needs of various industries and to the many different conditions of operation and use. A still further object is to provide improved features and refinements in the systems of the above character. These and other objects will become in part obvious and in part pointed out below.

Figure 6:
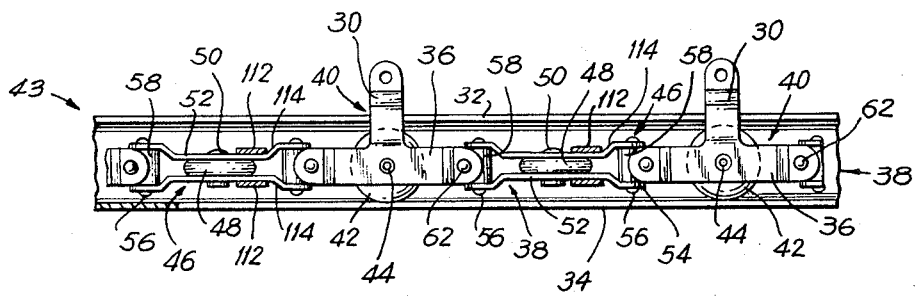
Figure 7:
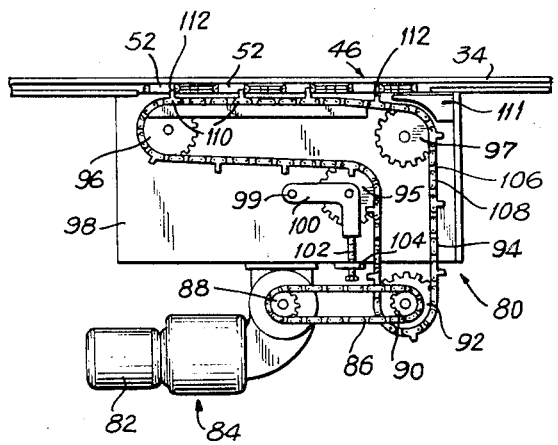

In the drawings:
FIGURES 1 and 2 are somewhat schematic representations of one embodiment of the invention;
FIGURE 3 is a perspective view of a portion of the conveyor system of FIGURE 1;
FIGURE 3A is a perspective view, partly broken away, showing the overlapping protective covering over the conveyor tube;
FIGURE 4 is a somewhat schematic side elevation of a portion of the conveyor system of FIGURE 1;
FIGURE 5 is an enlarged sectional view on the line 5—5 of FIGURE 1;
FIGURE 6 is a horizontal plan view of one of the driving units of the system of the embodiment of FIGURE 1 and a related portion of the conveyor track;
FIGURE 7 is a sectional view on the line 7—7 of FIGURE 6;
FIGURE 8 is a plan view of the end portion of the spiral conveyor of FIGURE 1; and,
FIGURE 9 is a side elevation taken at the bottom of FIGURE 8 and showing adjacent spirals of the conveyor.

Referring to FIGURE 1 of the drawings, the interior of a bakery is represented somewhat schematically, with an oven 2 which receives the products to be baked from a proofer 4. The items to be baked are produced at 6 and are carried by an endless conveyor 9 into proofer 4 along an incline 8, and from the proofer toward the oven along a discharge conveyor run 10. Within the proofer 4 is a multidecked spiral conveyor 18 which extends downwardly from the top spiral around the periphery of the proofer, and thence along the discharge conveyor run.

Proofer 4 has insulated side and top walls which provide a closed chamber during operation, except for the openings through which the conveyor passes carrying the products. Centrally positioned within the proofer is an air conditioning system 14 which provides uniform circulation of air over the products upon the conveyor system by means of a blower (not shown) which circulates the air throughout the proofer enclosure. System 14 also conditions the air and maintains the desired temperature and humidity conditions. The product moves at a constant rate through the proofer, starting at the top of the spiral and passing along the continuous path around the successive turns of the spiral without being jarred or roughly handled. Also, the products are subjected to uniform conditions, so that each item is processed identically with each other item. The speed of movement of the conveyor is controlled, and its speed is adjusted for each particular type of product, with the speed of movement being such that each product item remains within the proofer the exact period of time required for optimum quality.

As shown in FIGURE 2, conveyor 9 is provided with three drive units 80 which will be described more fully below, and which impart uniform driving movement to the conveyor.

Referring now to FIGURE 3, conveyor 9 is formed by a series of product-supporting racks 22, each of which comprises two transverse bars 24 and a bar which is bent in a zig-zag form to provide a number of generally longitudinal bar portions or product-supporting bars 26. Hence, each bar 26 is interconnected to the next bar at its lead end by a U-bend 47, and at its trailing end by a U-bend 27. The U-bends 47 overlap with the U-bends 27 of the next leading rack. Hence, continuous support is provided for products resting upon the bars 26. Also, the individual racks may move separately around bends and turns without restrictions which would be present with a continuous belt-type of conveyor. Each rack is separately supported by a rail assembly 21 and a bracket 28 which supports the transverse bars 24 of the rack 22 at the approximate midpoint thereof (see also FIGURE 5), each bracket 28 being supported by a conveyor chain and tube assembly 43. Each bracket 28 is bolted to and supported by a vertical bracket 30 which extends through a slot 32 into a conveyor tube 34 and (see FIGURE 7) is integral with an interconnecting link 36 of an endless conveyor chain 38 which is enclosed within tube 34.

Rail assembly 21 is formed by a plurality of spaced transverse supporting brackets 23 which are supported by a frame construction (not shown). Each bracket 23 has a central slot 25 in which tube 34 is rigidly mounted, and at each side there is a slot 29 in which a nylon runner 31 is clamped, and a slot 33 in which a side plate 35 is clamped. Hence, each of the racks 22 is supported by the combined action of its bracket 28 and the two runners 31. The side plates 35 assist in guiding the products and providing protection from the side. Positioned over slot 32 is a cover 37 formed by a series of overlapping strips of sheet neoprene each of which has two rectangular openings 39 and 41 through which two adjacent brackets 30 extend.

Opening 39 is at the trailing end of strip and fits somewhat closely on the bracket. Opening 41 is at the leading end of the strip and is elongated so that its bracket may move longitudinally of the strip. The strips overlap in "shingle style" with the leading end of each positioned over the trailing end of the next leading strip. As shown best in FIGURE 5, cover 37 is at an angle to the horizontal and it tends to deflect to the side product crumbs or other materials which drop onto it. Cover strips 37 are flexible and move with racks 22 and conveyor chain 38 with slot 32 thus covered, tube 34 is closed except at its ends and at the zones where it is driven (see FIGURES 5, 6 and 9).

Conveyor chain 38 is formed by a series of interconnected units 40 and 46 which are similar to each other. Each unit 40 has a roller 42 with a horizontal shaft 44, and each unit 46 has a roller 48 with a vertical shaft 50. Each unit 46 also has a pair of identical links 52 and at each end of the unit the ends 54 of links 52 are connected by a pivot 56, to a connector 58. Each of units 40 is similarly constructed, with its links 36 and a mating link 60 (see FIGURE 5) which is identical with links 52. Each end of each pair of links 36 and 60 is also connected by a pivot pin 62 to the adjacent connector 58 so as to provide a universal pivot connection between each end of each of the units 40 and the next adjacent units 46. The central portions of links 52 are spaced relatively close together so as to provide side plates for the roller between them, while the ends of the links are spaced apart to provide an enlarged interconnecting pivot. Links 36 and 60 are similarly constructed.

Units 40 and 46 form an endless conveyor which moves within tube 34 and can follow and turn with the contour of the tube. Rollers 42 provide vertical support and rollers 48 provide horizontal guidance. Also, each of the racks 22 is rigidly mounted upon its unit 40 so that it is moved by the conveyor chain 38 and the conveyor chain provides support.

The portion of the conveyor illustrated in FIGURE 4 is the discharge conveyor run 20 in FIGURES 1 and 2, and tube 34 terminates and the conveyor chain 38 passes around a cog wheel 66. At the bottom of the cog wheel the endless conveyor re-enters tube 34. Slot 32 (FIGURE 5) is positioned at the side of the vertical center of tube 34 so that each of the rollers 42 rests upon the wall of tube 34 (the top of the tube in FIGURE 5) and provides support for its unit 40 and the attached rack 22. Hence, the racks are inverted and carried below tube 34 along the return run of the conveyor. As shown best in FIGURE 4, a tank 70 of detergent and a tank of rinsing water 72 are positioned beneath the return run of the conveyor and tube 34 loops downwardly above the tank so as to dip the racks successively into the detergent and the rinse water. This provides systematic cleaning of the racks at the end of the conveyor run.

Referring now to FIGURE 7, each of the conveyor chain drive units 80 comprises: an electric motor 82; an adjustable speed gear reduction assembly 84; a driving chain 86 which extends between cog wheels 88 and 90; a cog wheel 92 which is fixed to cog wheel 90; a driving chain 94; and three cog wheels 95, 96 and 97 which are mounted upon a mounting plate 98. Cog wheel 95 is swingably mounted upon a pivot 99 by a pair of brackets 100, and an adjusting screw bolt 102 is provided to adjust the tension on driving chain 94. That is, bolt 102 is threaded in a bracket 104, and when it is turned clockwise it swings brackets 100 and cog wheel 95 counterclockwise about pivot 99 so as to tighten the drive chain.

Drive chain 94 is formed by center links 106, side links 108 and driving links 110 (see also FIGURE 7). Each of the driving links 110 has a pair of spaced driving lugs 112 which are so spaced as to project directly above and below the center portions of the two links 52. As shown at the left in FIGURE 7 when one of the driving links 110 passes around cog wheel 96 it moves in behind the leading end of a pair of the links 52, and the driving lugs 112 ride in against the shoulders 114 formed by the spaced ends of the links. Hence, the driving movement is transmitted uniformly to the conveyor chain in an efficient and dependable manner.

Driving chain 94 has the driving links spaced so that a pair of lugs 112 engage the shoulders 114 of each of the units 46 of the conveyor chain. However, the pitch of the driving chain 94 is less than the pitch of the conveyor chain 38 so that the distance between each of the pairs of lugs 112 and the next is slightly less than the distance between adjacent pairs of shoulders 114 on the links 52. As represented in FIGURE 7, when a pair of driving lugs 112 is in driving relationship with the shoulders on the pair of links 52, there are three other pairs of driving lugs projecting along the next leading pairs of shoulders 114 on links 52. However, due to the slight lesser pitch of the adjacent driving lugs 112 relative to the spacing of shoulders 114, the right-hand pair of driving lugs 112 is not in driving relationship with its lugs; that is; the driving lugs 112 adjacent sprocket wheel 97 are no longer assisting in driving the conveyor chain. A wedge finger 111 is mounted upon the frame between sprocket wheel 97 and the conveyor chain. This wedge finger acts to wedge the driving links away from the conveyor chain whenever there is a tendency for a driving lug to stick. Therefore, when the driving link moves around sprocket wheel 97 the driving lugs are withdrawn easily from the conveyor chain without causing any undesirable effect.

As shown in FIGURE 5, one of the conveyor chain units carries a brush 136 which continuously sweeps the inside wall of tubes 34 and 122 so as to clean out any loose materials which fall into the tubes.

FIGURES 8 and 9 show the mounting arrangement at the ends of the spiral conveyor 18. The end of the spiral (shown in FIGURE 8 and at the top of FIGURE 9) is formed by two parallel straight sections 119 and a U-shaped end section 121. End section 121 is formed by: a U-shaped tube 122; a slightly larger tube 120 at each end of tube 122, and into which tube 122 is snugly telescoped, and also into which the end of the respective straight tube 34 is telescoped; U-shaped side plates 135 which overlap at their ends with the side plates 35; runners 131 which overlap at their ends with runners 31; three transverse brackets 123 which are similar to brackets 23, two of which are mounted at the ends of the U-shaped end section and the other of which mounted at the center; transverse reinforcing strips 132; and a reinforcing bar 133. A rigid frame construction 130 supports the U-shaped end section 121, with the center transverse bracket 123 slidably resting upon the frame construction. This mounting permits the U-shaped end section 121 to slide longitudinally with respect to the straight sections 119.

Mounted at each end of the U-shaped section, there is an air cylinder and piston unit 138 which has its piston rod connected to a bracket 140 fixed to the slidable U-shaped end section and its cylinder 142 mounted upon a stationary bracket. These cylinders are supplied with air at a predetermined pressure so that the two assemblies urge the U-shaped end section away from the straight sections 119 with a predetermined effective force. A pressure-relief valve (not shown) insures that the air pressure will be uniform, and that the force exerted will be of the desired magnitude. Also, the pressure exerted by these cylinders may be changed as desired. With this arrangement, the conveyor chain is drawn longitudinally of the tubes 34, so that the conveyor chain has the required tautness. Hence, entire conveyor system will be conditioned for proper operation. Also, the plurality of drive units 80 tend to distribute the work load between them automatically. For example, when the conveyor is heavily loaded in one section and lightly loaded elsewhere, the drive units still operate in a dependable and efficient manner, and without overloading any one of them.

In FIGURE 9 the lower U-shaped end section 221 does not slide, but is supported by hanger strips 222 from the fixed frame above it. Hence, some of the U-shaped end sections in the conveyor need not be slidably mounted, as is the top section 121.

Proofers incorporating the present invention provide very precise control upon the proofing of the bread products. The attempts at obtaining a uniform distribution of the air within the prior types of proofers have not produced completely uniform conditions for the various items. With such proofers, the positions of the products or items upon a tray or upon a rack may cause them to be maintained at different temperatures or humidity, one being satisfactory and the other not, neither being satisfactory. The conveyor of the present invention permits maintaining uniform circulation of the air so that the position of an item transversely is not significant from that standpoint. Also, each item moves from the top level to the bottom level in the proofer, and also throughout the entire spiral path, so that all of the product items pass through the same zones. Hence, if the conditions in one zone vary from those in another, each item is still given the uniform treatment. With some prior proofers, the construction and operation were such that it is not possible to maintain the desired humidity conditions without causing condensation of moisture in some zones and resultant damage to the products. The present arrangement avoids that difficulty, the air may circulate freely, and there are no pockets where the air is cooled sufficiently to cause condensation. It has been pointed out that the present invention gives wide leeway in the conditions and timing for various products. With prior proofers some attempts to obtain maximum production have resulted in an objectionably high percentage of inferior products. With the present invention, the optimum operating conditions for each type of product may be determined, and the operation can then be accurately carried on.

The term "proofer," as used herein, means a machine in which leavened dough is kept at a controlled temperature for raising, although the present invention also contemplates simultaneous, active control of the humidity. The term "proofing" is used as meaning the process of holding the leavened bread under proper conditions in a proofer.

What is claimed is:

1. In dough processing apparatus, the combination of, means forming an enclosure having a peripheral wall, an endless conveyor including a spiral conveyor within said enclosure, said conveyor being adapted to receive dough products and to convey them at a predetermined continuous rate along the path of said spiral conveyor, and means to supply conditioned air in contact with said products, said conveyor comprising an endless conveyor chain and a continuous array of vertical brackets having grid portions supported in spaced relationship upon said chain and each providing a relatively fixed support for the products at a support surface with the products remaining relatively fixed with respect to the respective grid portions throughout the movement along said path, each said grid portion comprising a product support surface mounted at the top of a bracket above said chain, and each said product support surface including generally longitudinal bar portions extending more than one half the distance between adjacent brackets thereby to overlap with the next adjacent support surface.

2. Apparatus as described in claim 1 wherein said spiral conveyor includes a spiral formed by straight portions and U-shaped portions, means mounting one of said U-shaped portions to be slidable longitudinally of said straight portions, and means urging said U-shaped portion in a direction away from said straight portions.

3. In an apparatus for processing dough products, the combination of, means forming an enclosure having a peripheral wall, an endless conveyor including a spiral conveyor within said enclosure, said conveyor being adapted to receive dough products and to convey them at a predetermined continuous rate along the path of said spiral conveyor, means to supply conditioned air in contact with said products, said conveyor comprising an endless chain and a continuous array of vertical brackets having grid portions supported in spaced relationship upon said chain and each providing a relatively fixed support for the products at a support surface with the products remaining fixed with respect to the respective grid portions throughout the movement along said path, said spiral conveyor including a spiral formed by straight portions and U-shaped portions, means mounting one of said U-shaped portions to be slidable longitudinally of said straight portions, and a pair of cylindrical piston units and means constituting a fluid supply urging said U-shaped portion in a direction away from said straight portions.

4. Apparatus as described in claim 3 which includes, means holding said conveyor chain to it, and a plurality of independently operating drive units for driving said conveyor chain.

5. In an apparatus for processing dough products, the combination of, means forming an enclosure having a peripheral wall, an endless conveyor including a spiral conveyor within said enclosure, said conveyor being adapted to receive dough products and to convey them at a predetermined continuous rate along the path of said spiral conveyor, means to supply conditioned air in contact with said products, said conveyor comprising an endless chain and a continuous array of vertical brackets having grid portions supported in spaced relationship upon said chain and each providing a relatively fixed support for the products at a support surface with the products remaining fixed with respect to the respective grid portions throughout the movement along said path, said chain mounted within a tube having a longitudinal slot through which said brackets are supported, and cover means for said slot comprising a plurality of flexible cover strips each of which is mounted at one end of said brackets and extends beyond a next adjacent bracket, said strips being overlapped in "shingle style."

6. In an apparatus for processing dough products, the combination of, means forming an enclosure having a peripheral wall, an endless conveyor including a spiral conveyor within said enclosure, said conveyor being adapted to receive dough products and to convey them at a predetermined continuous rate along the path of said spiral conveyor, means to supply conditioned air in contact with said products, said conveyor comprising an endless chain and a continuous array of vertical brackets having grid portions supported in spaced relationship upon said chain and each providing a relatively fixed support for the products at a support surface with the products remaining fixed with respect to the respective grid portions throughout the movement along said path, and drive means for said conveyor chain comprising a drive unit having a drive chain with lugs thereon which are moved along a path parallel to said conveyor chain and are adapted to engage therewith.

References Cited

UNITED STATES PATENTS

| | | | |
|---|---|---|---|
| 2,664,188 | 12/1953 | Rhodes | 198—136 |
| 2,780,182 | 2/1957 | Rand. | |
| 3,027,994 | 4/1962 | Lanham. | |
| 3,285,394 | 11/1966 | Lanham et al. | 198—136 X |
| 3,240,316 | 3/1966 | Huffman et al. | 198—85 |

WALTER A. SCHEEL, *Primary Examiner.*

JOSEPH SHEA, *Assistant Examiner.*

U.S. Cl. X.R.

198—136, 154

REEXAMINATION CERTIFICATE (614th)
United States Patent [19]
Lanham et al.

[11] B1 3,440,973
[45] Certificate Issued Jan. 6, 1987

[54] PROOFERS FOR BREAD PRODUCTS AND CONVEYOR SYSTEMS WHICH ARE ADAPTED TO USE THEREIN

[76] Inventors: William E. Lanham, 3456 Woods Dr.; Gene C. Miller, 3540 Woods Dr.; William E. Lanham, Jr., 3044 Katherine Valley Rd., all of Decatur, Ga. 30032

Reexamination Request:
No. 90/000,883, Oct. 11, 1985

Reexamination Certificate for:
Patent No.: 3,440,973
Issued: Apr. 29, 1969
Appl. No.: 593,504
Filed: Nov. 10, 1966

Related U.S. Application Data

[63] Continuation-in-part of Ser. No. 448,732, Apr. 16, 1965, Pat. No. 3,285,394.

[51] Int. Cl.[4] ............... A21C 9/00; A23G 7/00
[52] U.S. Cl. ............................. 99/483; 34/147; 34/203; 198/495; 198/848
[58] Field of Search ............ 99/483, 467, 474; 198/831, 838, 845, 852, 853

[56] References Cited

U.S. PATENT DOCUMENTS

| | | |
|---|---|---|
| 1,902,873 | 3/1933 | Marone . |
| 1,948,090 | 2/1934 | Alvey . |
| 3,285,394 | 11/1966 | Lanham et al. . |
| 3,363,744 | 1/1968 | Green et al. . |

OTHER PUBLICATIONS

Jervis B. Webb Company, Continuous Overhead Conveyor Systems, 1951, 74–75.
The Cambridge Wire Cloth Co., Cambridge Conveyor Belts, 1961, 90–91.
J. W. Greer Company, Greer Technical Information Sheet #BT101, 1963, 4, 6.

*Primary Examiner*—Timothy F. Simone
*Attorney, Agent, or Firm*—George B. Snyder; Pasquale A. Razzano; Theodore F. Shiells

[57] ABSTRACT

A proofing system for bakery products wherein an endless conveyor carries bakery products to be proofed through a proofing enclosure where the products are subjected to uniform proofing conditions.

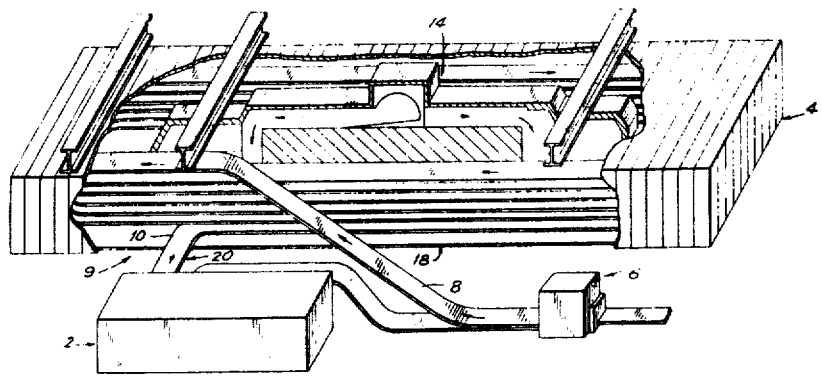

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *